United States Patent
Chen et al.

(10) Patent No.: US 7,193,819 B1
(45) Date of Patent: Mar. 20, 2007

(54) METHOD OF ASSEMBLING A DISK DRIVE INCLUDING ACTUATING A SHIPPING COMB TO BEND A SUSPENSION VERTICALLY TO FACILITATE A MERGE TOOL

(75) Inventors: Yih-Jen Dennis Chen, Fremont, CA (US); Drew B. Lawson, Los Gatos, CA (US); Darrell D. Palmer, San Jose, CA (US); Serge Hauert, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 111 days.

(21) Appl. No.: 10/698,713

(22) Filed: Oct. 31, 2003

(51) Int. Cl.
*G11B 5/55* (2006.01)
(52) U.S. Cl. .................................. 360/265.7
(58) Field of Classification Search .............. 360/265.7
See application file for complete search history.

(56) References Cited

U.S. PATENT DOCUMENTS 4,644,429 A * 2/1987 Boe ........................ 360/255.2
4,787,000 A * 11/1988 Schulze .................... 360/254.4
4,851,943 A * 7/1989 Perry ....................... 360/254.3
5,826,325 A 10/1998 Price et al.
6,069,773 A 5/2000 Frater et al.

* cited by examiner

Primary Examiner—David Davis
(74) Attorney, Agent, or Firm—Howard H. Sheerin, Esq.; Milad G. Shara, Esq.; Joshua C. Harrison, Esq.

(57) ABSTRACT

A head stack assembly (HSA) is disclosed for use in a disk drive comprising a disk, wherein a merge tool is used to merge the HSA with the disk. The HSA comprises at least one actuator arm with a suspension connected to the distal end of the actuator arm. A multi-level shipping comb attached to the actuator arm comprises a finger having a first surface and a second, raised surface. During shipping of the HSA, the first surface of the finger contacts the suspension to protect against overstressing. During manufacture of the disk drive, the shipping comb is actuated so that the second surface contacts the suspension thereby bending the suspension in a vertical direction to facilitate the insertion of the merge tool.

5 Claims, 7 Drawing Sheets

METHOD OF ASSEMBLING A DISK DRIVE INCLUDING ACTUATING A SHIPPING COMB TO BEND A SUSPENSION VERTICALLY TO FACILITATE A MERGE TOOL

BACKGROUND OF THE INVENTION

1. Field of the Invention

The present invention relates to disk drives. In particular, the present invention relates to a head stack assembly comprising a multi-level shipping comb to facilitate merging heads with disks.

2. Description of the Prior Art

FIG. 1 shows a prior art disk drive comprising a disk stack having at least one disk 4 and a head stack assembly (HSA) 6 installed in a base casting 8 which is enclosed by a cover 10 to form a head disk assembly (HDA). The HSA 6 comprises a number of actuator arms 12 which are rotated about a pivot 13 by a voice coil motor (VCM) 14. A suspension 16 is attached to the distal end of each actuator arm 12, and a head 18 is attached to the distal end of the suspension 16. The suspension 16 biases the head 18 toward the surface of the disk 4, and as the disk 4 rotates about its center axis an air bearing forms between the head 18 and the disk 4 so that the head 18 flies just above the disk 4 during read/write operations. When manufacture the disk drive 2, the HSA 6 is installed into the base casting 8 such that the actuator arms 12 fit into gap 20. The actuator arms 12 are then rotated about the pivot 13 in order to "merge" the heads 18 with the respective disk surfaces.

After the HSA 6 is manufactured, a shipping comb is attached to protect the suspension 16 during storage and shipping. For example, with an HSA comprising multiple suspensions (FIG. 3) the shipping comb prevents the suspensions from colliding into one another. The shipping comb also protects the suspensions from overstressing. FIGS. 2A and 2B show a prior art shipping comb 22 which has a pin 24 that is inserted through an aperture 26 in the actuator arm 12. A latching member 28 secures the shipping comb 22 to the actuator arm 12 and a finger 30 maintains the suspension 16 in a near optimal vertical position. The vertical movement of the head 18 is also limited by a tab 32 to protect against head damage. Only the bottom suspension 16 and head 18 are shown in FIGS. 2A and 2B, the top suspension and head are not shown for clarity. FIG. 3 shows a prior art shipping comb 32 comprising a plurality of fingers 34 for maintaining a number of top and bottom suspensions in a near optimal vertical position during storage and shipping.

To facilitate installing the HSA 6 when manufacturing the disk drive a merge tool is employed to hold the suspension 16 in place while the actuator arm 12 is rotated to position the head 18 over the surface of the disk 4. Referring again to FIGS. 2A and 2B, after the merge tool engages the suspension 16, the shipping comb 22 is rotated (clockwise in FIG. 2B) to detach the shipping comb 22 from the actuator arm 12 prior to performing the merge. A problem with this prior art technique, however, is that when the merge tool engages the suspension 16 from the side the merge tool can scrape the suspension 16 causing damage to the suspension 16 as well as particle contamination. The particles generated from scraping can also contaminate the merge tool thereby affecting other drives since the merge tool is re-used to manufacture multiple drives.

There is, therefore, a need for a disk drive shipping comb that protects the suspension from damage when a merge tool engages the suspension during the merge operation.

SUMMARY OF THE INVENTION

The present invention may be regarded as a head stack assembly (HSA) for use in a disk drive comprising a disk, wherein a merge tool is used to merge the HSA with the disk during manufacturing of the disk drive. The HSA comprises at least one actuator arm, and a suspension connected to a distal end of the actuator arm. A head is connected to a distal end of the suspension. A multi-level shipping comb is attached to the actuator arm, wherein the multi-level shipping comb comprising at least one finger that limits relative vertical motion of the suspension. The finger comprises a first surface and a second surface, wherein the second surface is raised relative to the first surface. During shipping of the HSA, the first surface of the finger contacts the suspension to protect against overstressing the suspension. During manufacture of the disk drive, the shipping comb is actuated so that the second surface contacts the suspension thereby bending the suspension in a vertical direction to facilitate the insertion of the merge tool.

In one embodiment, the actuator arm comprises an aperture and the shipping comb comprises a pin and a latching member. The shipping comb is attached to the actuator arm by inserting the pin through the aperture of the actuator arm and rotating the shipping comb in a first direction until the latching member latches onto the side of the actuator arm and the first surface of the finger contacts the suspension.

In another embodiment, the shipping comb is actuated by rotating the shipping comb so that the second surface contacts the suspension thereby bending the suspension in a vertical direction to facilitate the insertion of the merge tool. In one embodiment, the shipping comb is actuated by rotating the shipping comb in the first direction, and in an alternative embodiment, shipping comb is actuated by rotating the shipping comb in a second direction opposite the first direction.

In still another embodiment, the second surface comprises a beveled surface with respect to the first surface, and the suspension slides over the beveled surface when the shipping comb is actuated.

In yet another embodiment, after the merge tool is inserted, the shipping comb is detached from the actuator arm by rotating the shipping comb in a second direction opposite the first direction. In one embodiment, after the merge tool is inserted the shipping comb is detached from the actuator arm causing the suspension to retract vertically and engage the merge tool.

In another embodiment, the suspension comprises a coating for contacting the first and second surfaces of the shipping comb finger to reduce friction between the finger and the suspension.

In yet another embodiment, the shipping comb finger comprises an arcuate shape such that the first and second surfaces comprise an arcuate shape, and the second surface comprises a radius larger than a radius of the first surface.

The present invention may also be regarded as a method for manufacturing a disk drive comprising a base casting, a disk, and a head stack assembly (HSA). The HSA comprises at least one actuator arm, a suspension connected to a distal end of the actuator arm, a head connected to a distal end of the suspension, and a shipping comb attached to the actuator arm that limits relative vertical motion of the suspension. The HSA is inserted into the base casting and the shipping comb actuated to bend the suspension in a vertical direction to facilitate the insertion of a merge tool comprising a finger for engaging the suspension. The merge tool is inserted such that the finger of the merge tool moves into position without scraping against the suspension. The shipping comb is detached from the actuator arm wherein the suspension retracts vertically and engages the finger of the merge tool. The merge tool is then actuated to merge the HSA with the disk.

DESCRIPTION OF THE PREFERRED EMBODIMENTS

Figure 1:
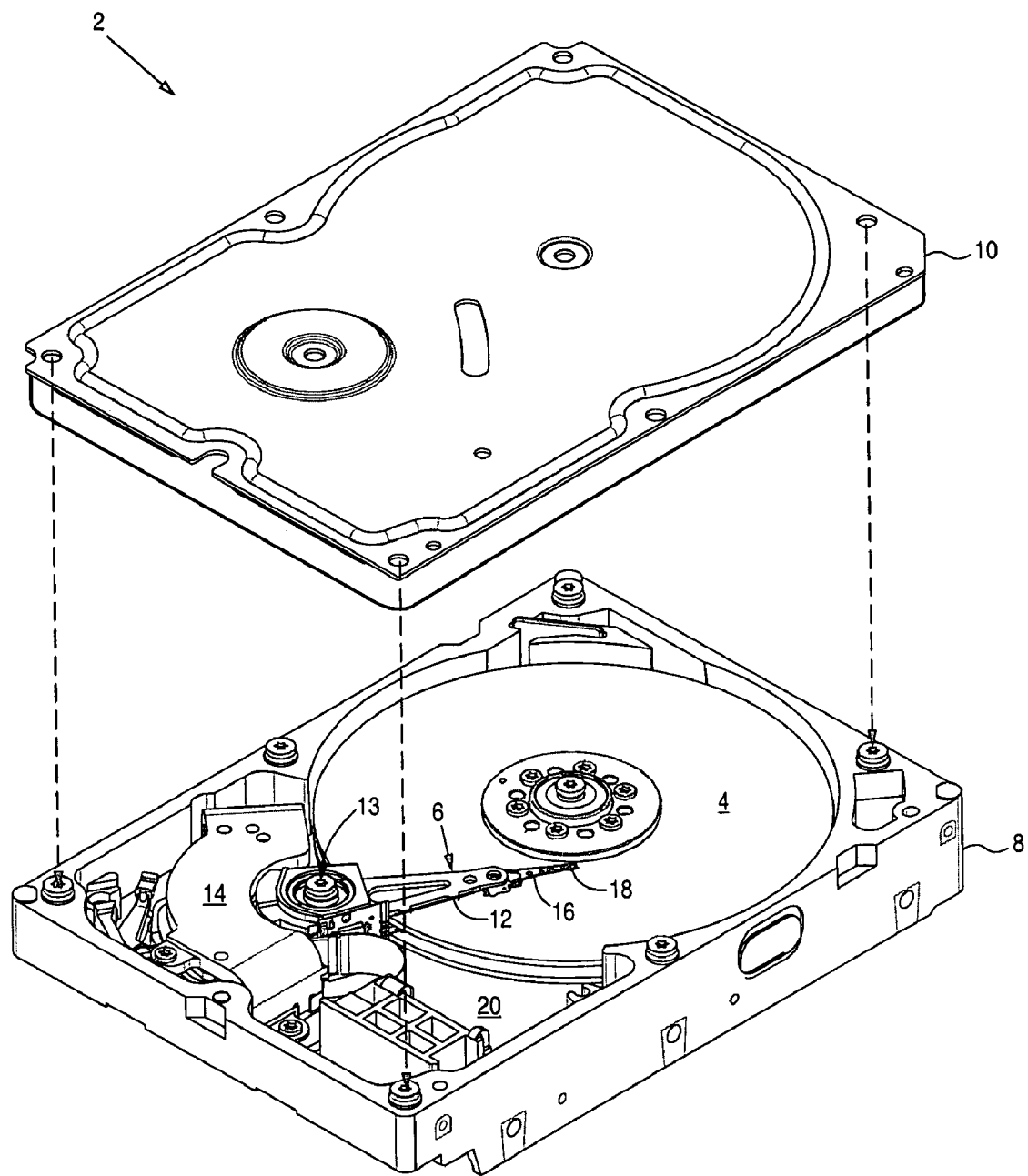
FIG. 1 shows a prior art disk drive including a disk and an HSA merged with the disk, wherein the HSA comprises an actuator arm, a suspension, and a head.
Figure 2A:
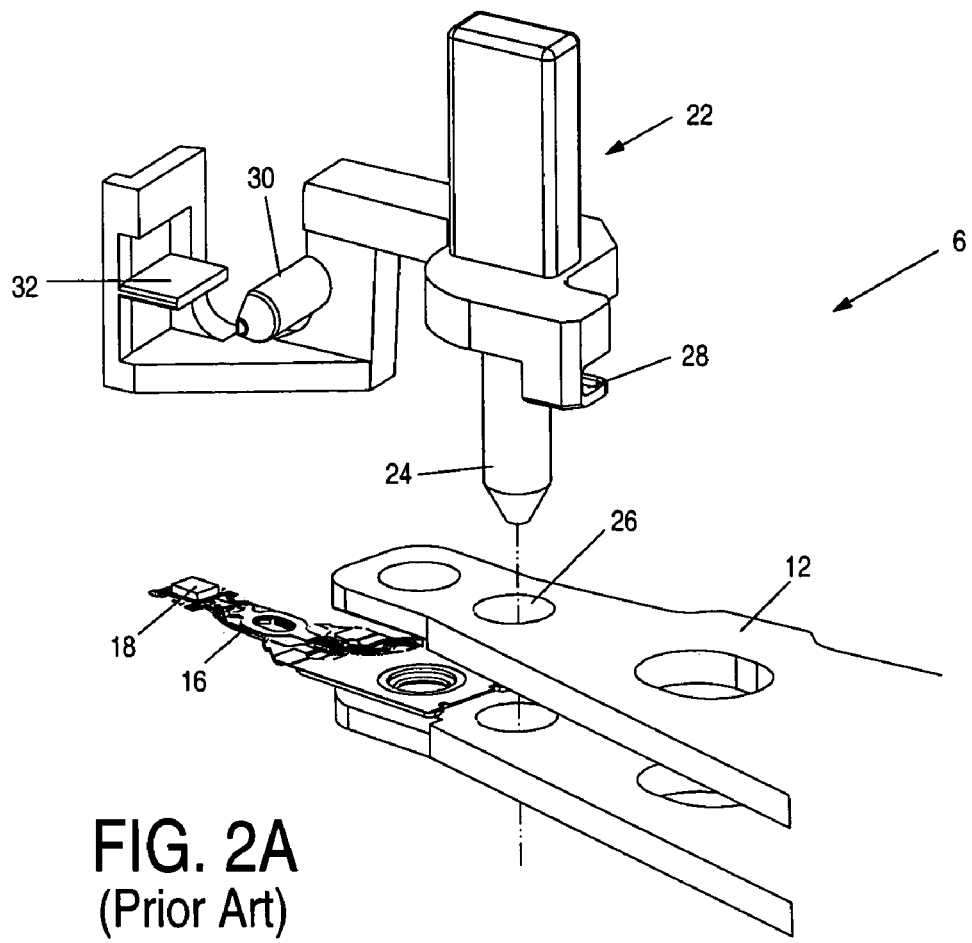
FIGS. 2A and 2B show a prior art HSA including a shipping comb comprising a finger for maintaining the suspension in a near optimal vertical position during shipping.
Figure 2B:
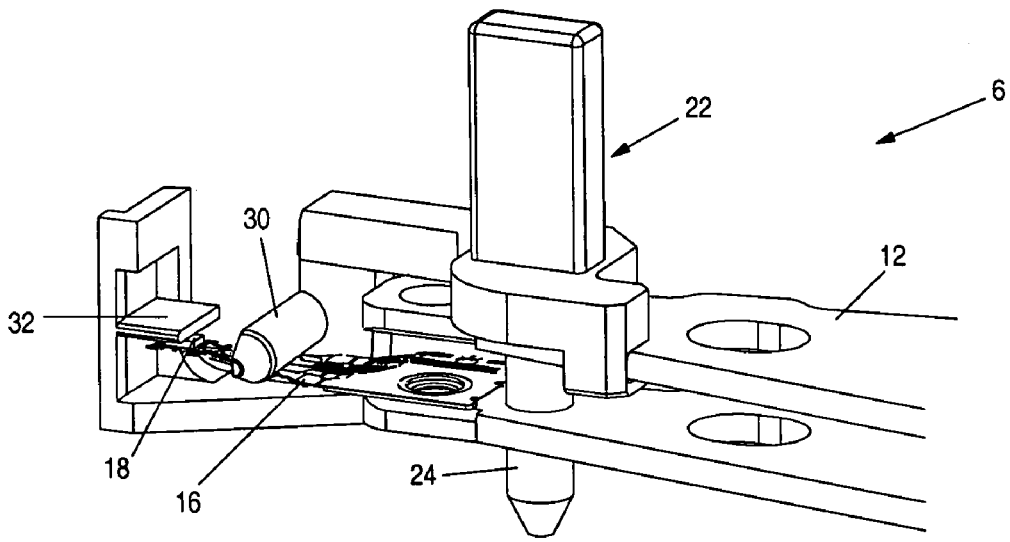
Figure 3:
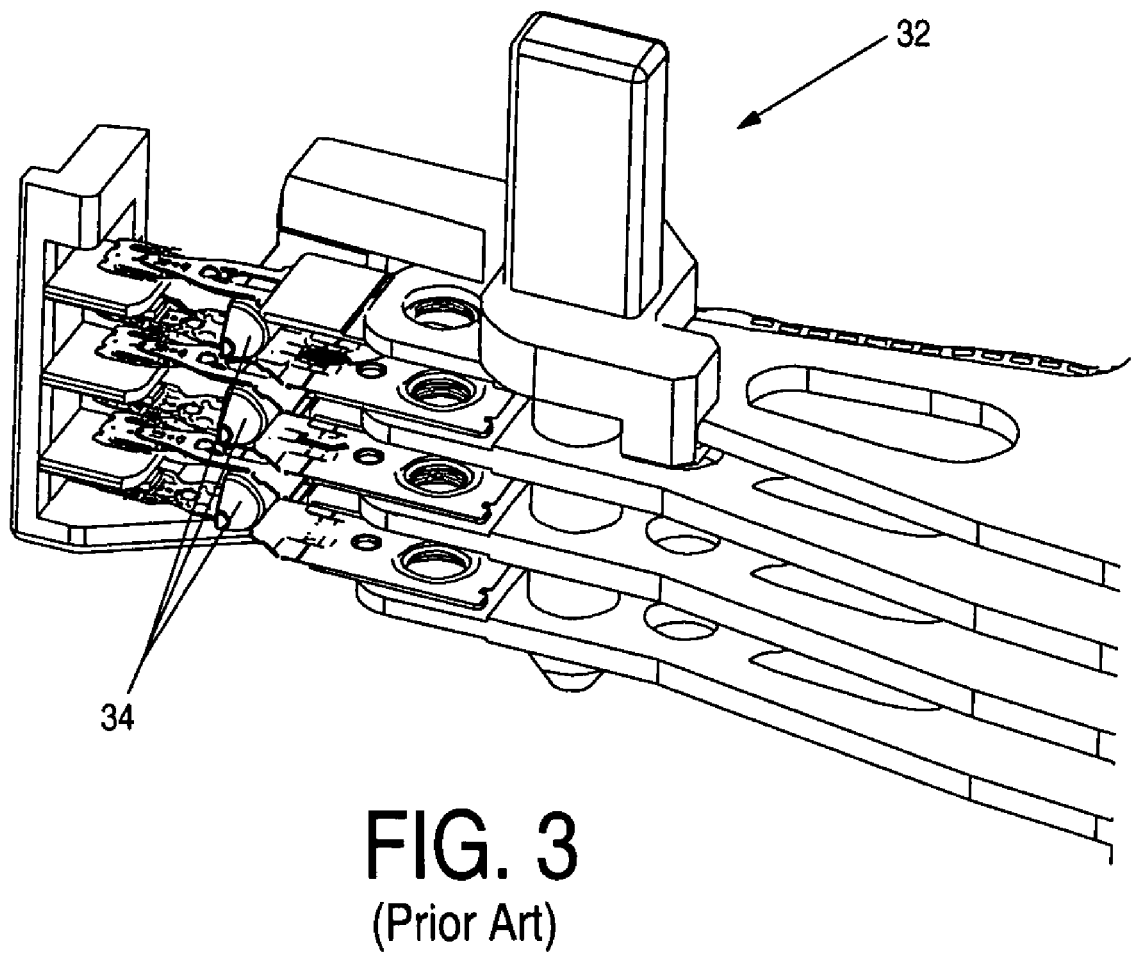
FIG. 3 shows a prior art HSA including multiple actuator arms with attached suspensions and a shipping comb comprising multiple fingers for engaging the multiple suspensions during shipping.
Figure 4A:
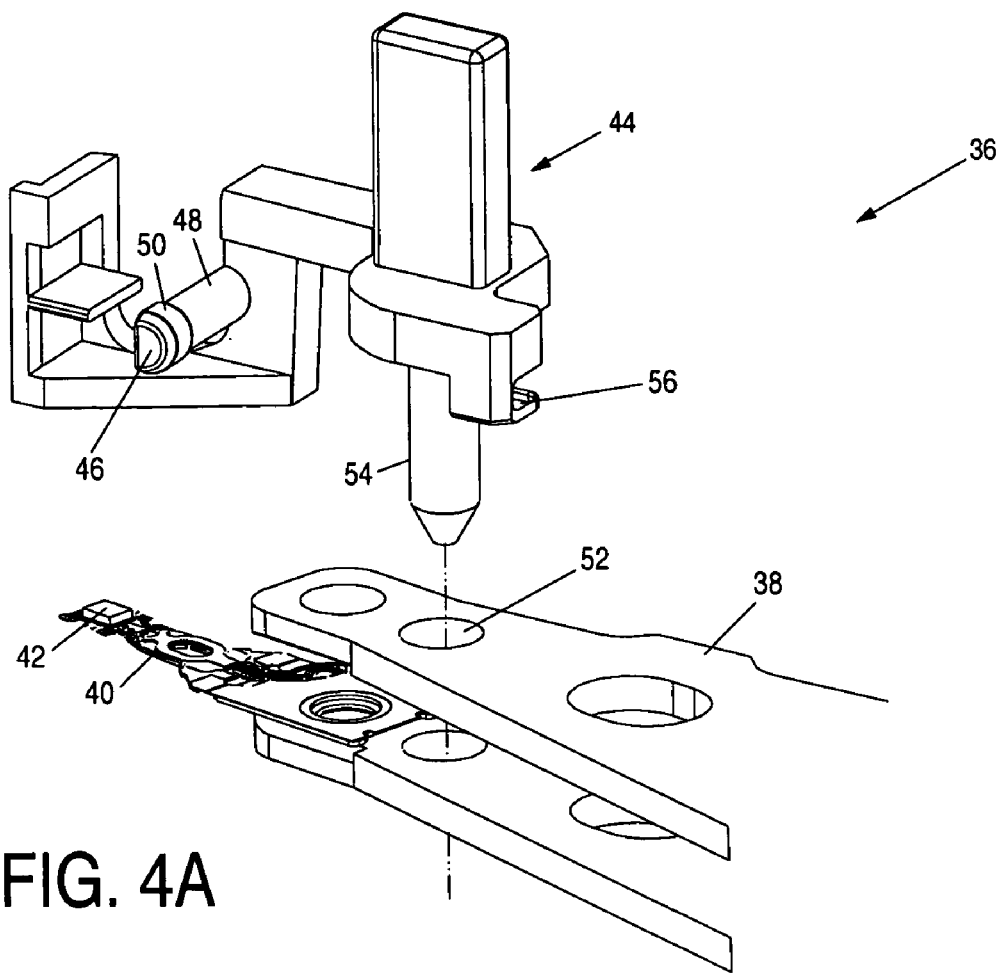
FIGS. 4A and 4B show an isometric view of a HSA according to an embodiment of the present invention including a multi-level shipping comb comprising a first surface and a second, raised surface to facilitate the insertion of a merge tool during manufacture of the disk drive.

FIG. 4A shows an isometric, exploded view of a head stack assembly (HSA) 36 according to an embodiment of the present invention for use in a disk drive comprising a disk, wherein a merge tool is used to merge the HSA 36 with the disk during manufacturing of the disk drive. The HSA 36 comprises at least one actuator arm 38, and a suspension 40 connected to a distal end of the actuator arm 40. A head 42 is connected to a distal end of the suspension 40. A multi-level shipping comb 44 is attached to the actuator arm (FIG. 4B), wherein the multi-level shipping comb 44 comprising at least one finger 46 that limits relative vertical motion of the suspension 40. The finger 46 comprises a first surface 48 and a second surface 50, wherein the second surface 50 is raised relative to the first surface 48. During shipping of the HSA, the first surface 48 of the finger 46 contacts the suspension 40 to protect against overstressing the suspension 40. During manufacture of the disk drive, the shipping comb 44 is actuated so that the second surface 50 contacts the suspension 40 thereby bending the suspension 40 in a vertical direction to facilitate the insertion of the merge tool.

Figure 4B:
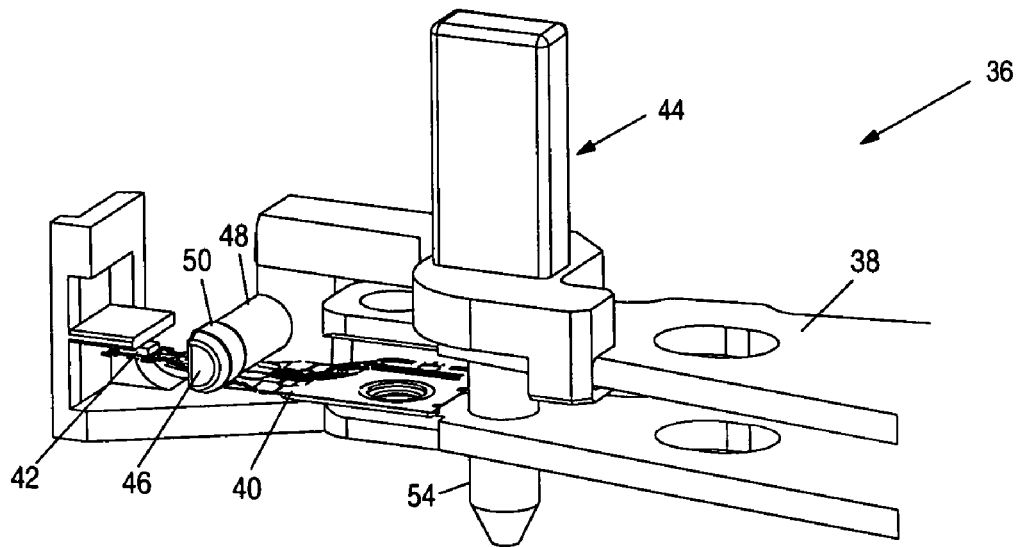

In the embodiment of FIG. 4A, the actuator arm 38 comprises an aperture 52 and the shipping comb 44 comprises a pin 54 and a latching member 56. The shipping comb 44 is attached to the actuator arm 38 by inserting the pin 54 through the aperture 52 of the actuator arm 38. The shipping comb 44 is then rotated in a first direction (counter-clockwise in this example) until the latching member 56 latches onto the side of the actuator arm 38 and the first surface 48 of the finger 46 contacts the suspension 40 (FIG. 4B).

Figure 4C:
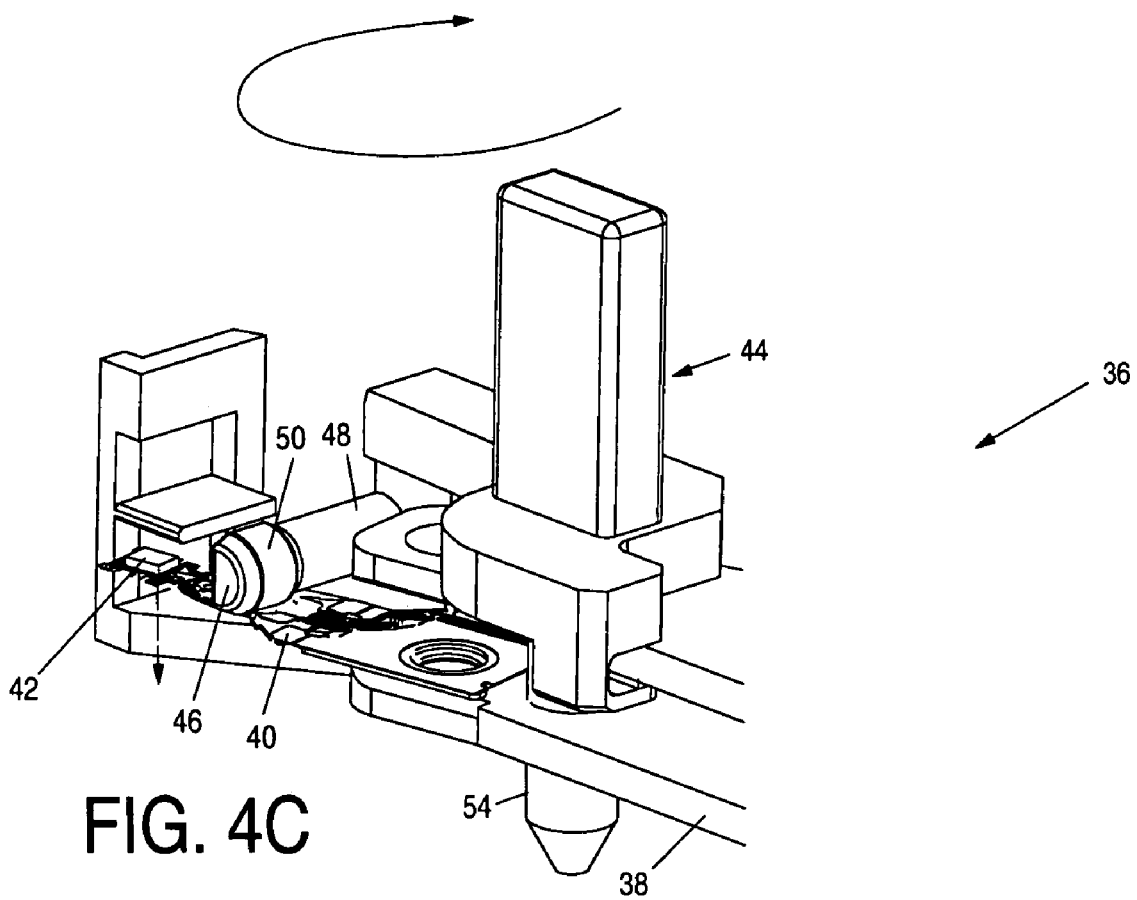
FIG. 4C illustrates how the multi-level shipping comb of FIG. 4B is actuated (rotated) so that the second surface of the finger contacts the suspension, thereby bending the suspension in a vertical direction to facilitate the insertion of the merge tool.

FIG. 4C illustrates how the shipping comb 44 is actuated by rotating the shipping comb 44 so that the second surface 50 contacts the suspension 40 thereby bending the suspension 40 in a vertical direction (downward in this example) to facilitate the insertion of the merge tool. In the embodiment of FIG. 4C, the shipping comb 44 is actuated by rotating it in a direction opposite the rotation when attaching the shipping comb 44 to the actuator arm 38. In an alternative embodiment described below with reference to FIG. 8, the shipping comb 44 is actuated by rotating it in the same direction as when attaching the shipping comb 44 to the actuator arm 38.

Figure 5:
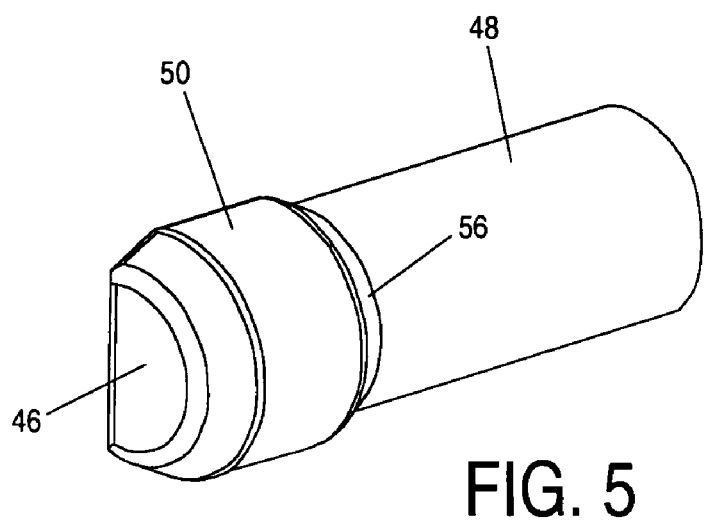
FIG. 5 shows a magnified view of the multi-level shipping comb finger, including beveled surface wherein the suspension slides over the beveled surface when the shipping comb is actuated.

FIG. 5 shows a magnified view of the finger 46 wherein the second surface 50 comprises a beveled surface 56 with respect to the first surface 50, and the suspension 40 slides over the beveled surface 56 when the shipping comb 44 is actuated. This is illustrated in FIG. 4C wherein when the shipping comb 44 is actuated by rotating it in the clockwise direction, the suspension 40 slides along the first surface 48, over the beveled surface 56, and onto the second, raised surface 50.

In one embodiment, after the merge tool is inserted the shipping comb 44 is detached from the actuator arm 38 by rotating the shipping comb 44 in a direction opposite the direction of rotation when attaching the shipping comb 44 to the actuator arm 38. Referring again to FIG. 4C, to detach the shipping comb 44 it is rotated in the clockwise direction and then lifted off the actuator arm 38 so that the pin 54 slides through the aperture 52 (see FIG. 4A).

Figure 6A:
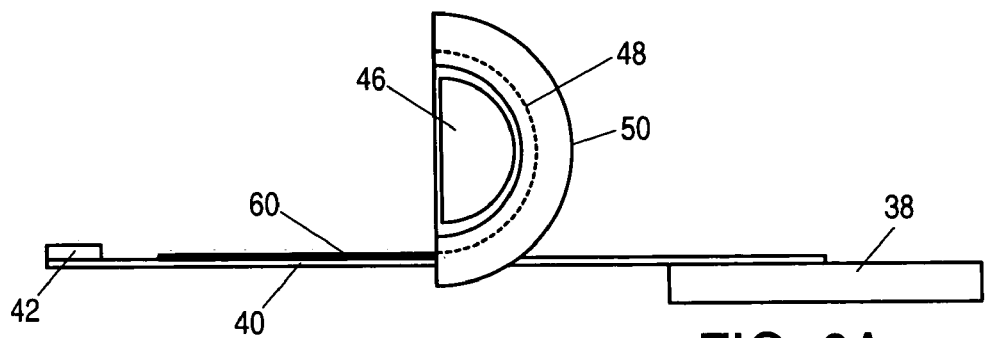
FIGS. 6A–6D illustrate orientation of the shipping comb and suspension of FIG. 4A during shipping, during insertion of the merge tool, and after the shipping comb has been detached prior to the merge operation.
Figure 6B:
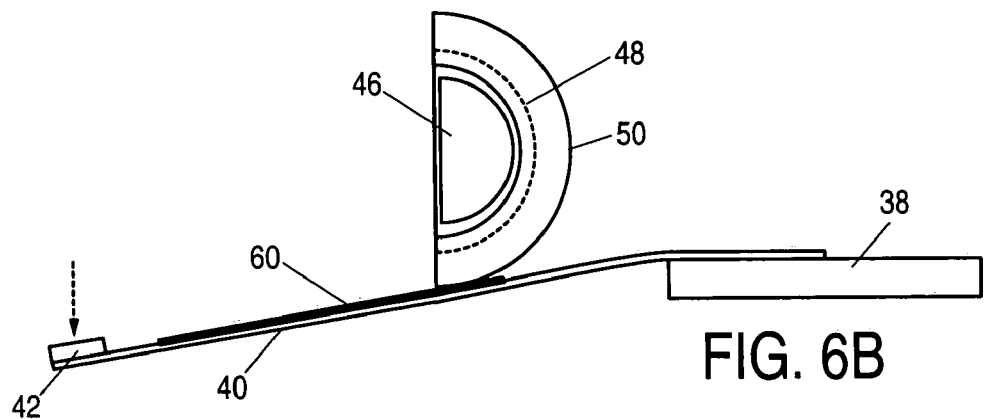
Figure 6C:
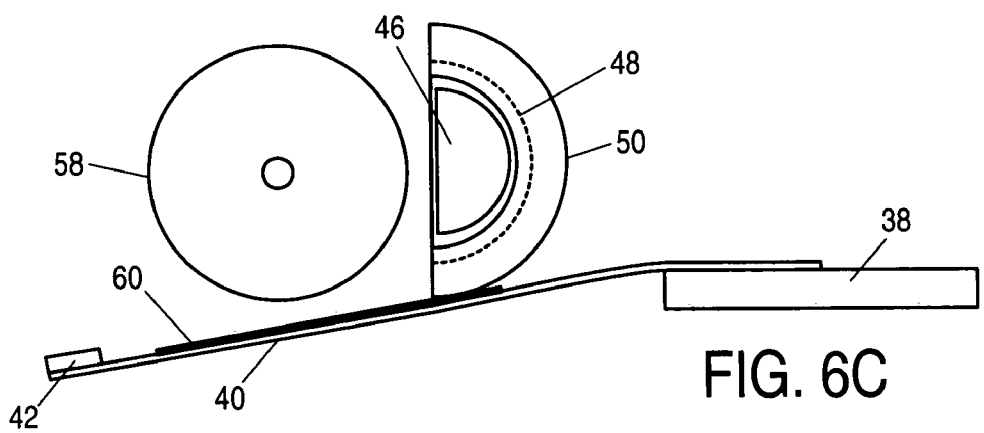
Figure 6D:
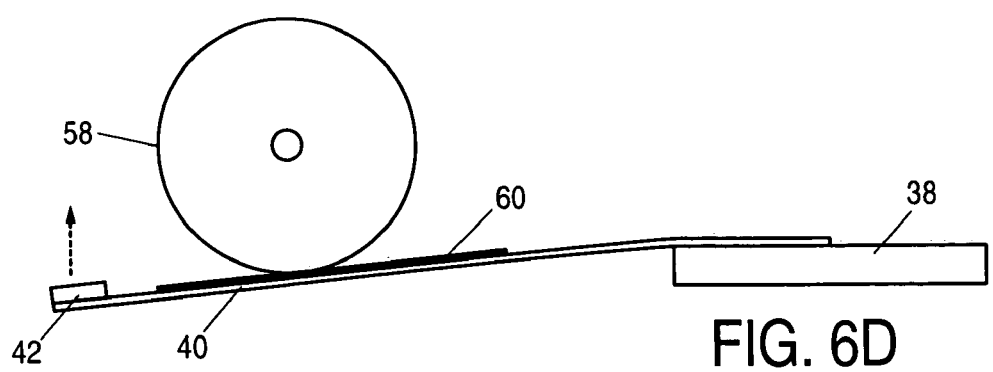

FIGS. 6A–6D illustrate orientation of the shipping comb 44 and suspension 40 of FIG. 4A during shipping, during insertion of the merge tool, and after the shipping comb 44 has been detached prior to the merge operation. FIG. 6A shows the finger 46 in the orientation during shipping of the HSA wherein the first surface 48 contacts the suspension 40 to protect against overstressing. FIG. 6B shows the finger 46 actuated into position so that the second surface 50 contacts the suspension 40 thereby bending the suspension 40 in a vertical direction (downward) to facilitate the insertion of the merge tool. FIG. 6C shows a finger 58 of the merge tool after insertion but prior to detaching the shipping comb 44. Because the suspension 40 is bent downward by the finger 46 of the shipping comb 44, the finger 58 of the merge tool does not scrape against the suspension 40 during insertion. FIG. 6D shows that after the shipping comb 44 is detached from the actuator arm 44 the suspension 40 retracts vertically (upward) and engages the finger 58 of the merge tool. The merge tool is then actuated to merge the HSA 36 with the disk.

In the embodiment shown in FIGS. 6A–6D, the suspension 40 comprises a protective coating 60 for contacting the first and second surfaces 48 and 50 of the shipping comb finger 46 to reduce friction between the finger 46 and the suspension 40 when attaching, actuating, and detaching the shipping comb 44. The protective coating 60 may comprise any suitable material, such as a photo sensitive organic film like polyimide or a liquid type cover coating. In addition, the finger 46 may comprise a suitable soft material, such as plastic, so that any friction will result in soft particles which are less problematic than hard particles caused by a hard material such as stainless steel. In addition, the shipping comb 44 is less likely to cut through the protective coating 60 if manufactured from a soft material such as plastic. Although the merge tool 58 is typically manufactured from a hard material, such as stainless steel, the multi-level operation of the shipping comb 44 helps prevent the merge tool 58 from scraping across the suspension 40 and cutting through the protective coating 60.

Figure 7:
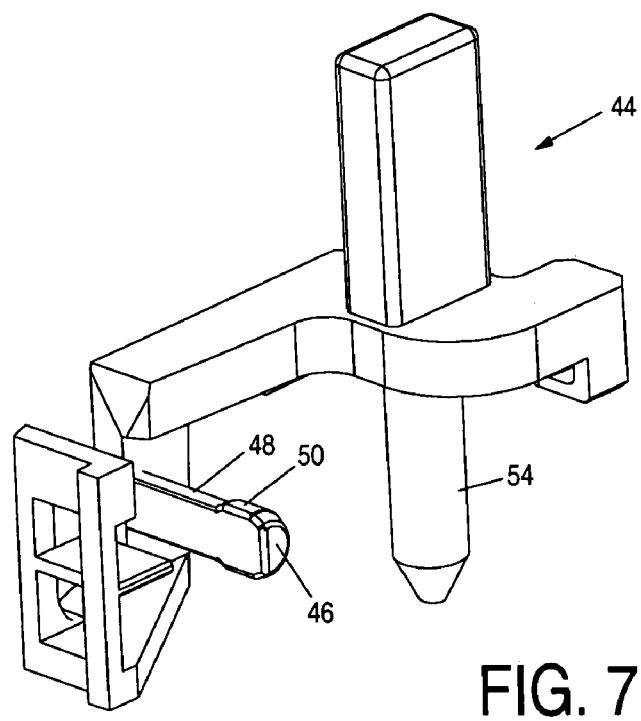
FIG. 7 shows a reverse isometric view of the shipping comb shown in FIG. 4A.

The finger 46 of the shipping comb 44 may also comprise any suitable shape. In the embodiments disclosed herein, the finger 46 comprises an arcuate shape such that the first and second surfaces 48 and 50 comprise an arcuate shape, and the second surface 50 comprises a radius larger than a radius of the first surface 48. FIG. 7 shows a reverse isometric view of the shipping comb 44 shown in FIG. 4A, which further illustrates the arcuate shape of the finger 46, the first surface 48, and the second, raised surface 50.

Figure 8:
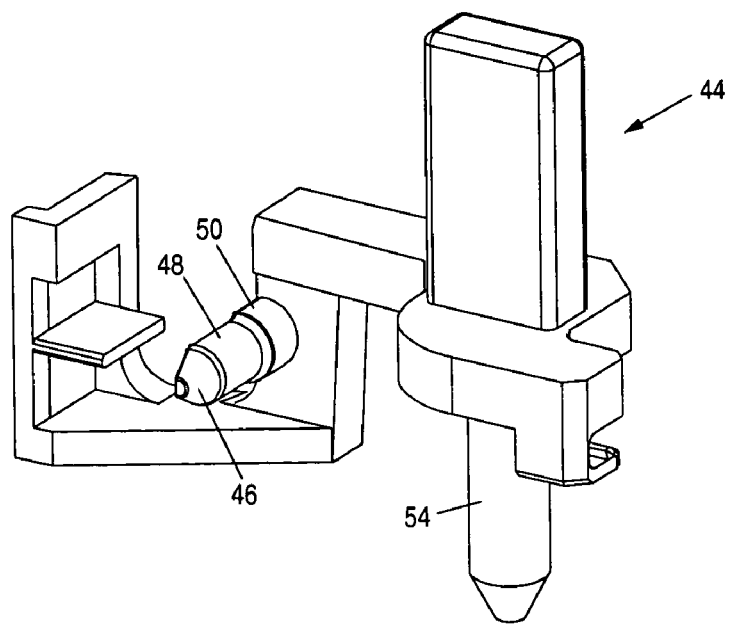
FIG. 8 shows an isometric view of a shipping comb according an alternative embodiment of the present invention wherein the second, raised surface is located on an interior diameter of the shipping comb finger.

The second, raised surface 50 may be implemented in any suitable configuration. In the embodiment shown in FIG. 4A, the second, raised surface 50 is located at an exterior diameter of the shipping comb finger 46. FIG. 8 shows an alternative embodiment of the present invention wherein the second, raised surface 50 is located at an interior diameter of the shipping comb finger 46. In this embodiment, the shipping comb 44 is actuated by rotating it in the counter-clockwise direction so that the second, raised surface 50 contacts the suspension 40 in order to bend it downward to facilitate insertion of the merge tool.

We claim:

1. A method of manufacturing a disk drive comprising a base casting, a disk, and a head stack assembly (HSA), the HSA comprising at least one actuator arm, a suspension connected to a distal end of the actuator arm, a head connected to a distal end of the suspension, and a shipping comb attached to the actuator arm that limits relative vertical motion of the suspension, the method comprising the steps of:
    (a) inserting the HSA into the base casting;
    (b) actuating the shipping comb to bend the suspension in a vertical direction to facilitate the insertion of a merge tool comprising a finger for engaging the suspension;
    (c) inserting the merge tool such that the finger of the merge tool moves into position without scraping against the suspension;
    (d) detaching the shipping comb from the actuator arm wherein the suspension retracts vertically and engages the finger of the merge tool; and
    (e) actuating the merge tool to merge the HSA with the disk.

2. The method as recited in claim 1, wherein the shipping comb is actuated by rotating the shipping comb to bend the suspension in a vertical direction to facilitate the insertion of the merge tool.

3. The method as recited in claim 1, wherein:
    (a) the shipping comb comprises a beveled surface; and
    (b) the suspension slides over the beveled surface when the shipping comb is actuated.

4. The method as recited in claim 1, wherein the shipping comb is detached from the actuator arm by rotating the shipping comb.

5. The method as recited in claim 1, wherein the suspension comprises a coating for reducing friction between the shipping comb and the suspension.

* * * * *